Figure 1:
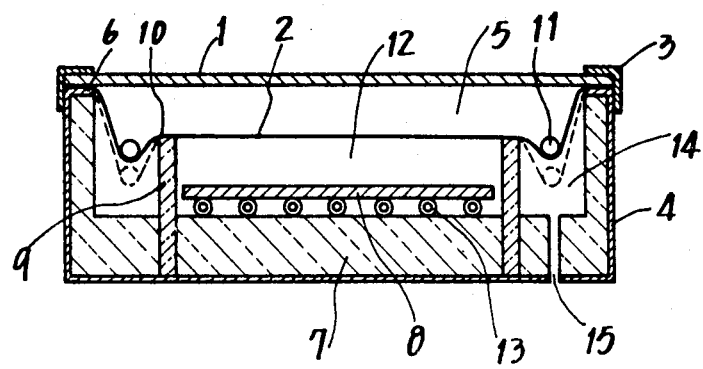

United States Patent [19]

Hozumi et al.

[11] 4,414,958

[45] Nov. 15, 1983

[54] SOLAR COLLECTOR

[75] Inventors: Shiro Hozumi, Sakai; Shin'ichi Aso, Ikoma; Minoru Tagashira, Katano; Kouji Ebisu, Moriguchi; Hideo Uchino, Higashiosaka, Japan

[73] Assignee: Matsushita Electric Industrial Co., Ltd., Osaka, Japan

[21] Appl. No.: 213,339

[22] Filed: Dec. 5, 1980

[30] Foreign Application Priority Data

Dec. 11, 1979 [JP] Japan .................................. 54-161104

[51] Int. Cl.³ .............................................. F24J 3/02
[52] U.S. Cl. .................................... 126/450; 126/417; 126/418; 126/448
[58] Field of Search ................. 126/450, 417, 448, 432

[56] References Cited

U.S. PATENT DOCUMENTS 4,143,641 3/1979 Christopher ......................... 126/450
4,279,243 7/1981 Deakin ................................ 126/450

Primary Examiner—Albert J. Makay
Assistant Examiner—Henry Bennett
Attorney, Agent, or Firm—Joseph W. Farley

[57] ABSTRACT

A solar collector comprising a heat collecting panel for receiving the sunlight, a cover glass arranged above the panel, and a sunlight-pervious diaphragm disposed between the panel and cover glass to form a closed space between itself and the cover glass, the diaphragm being adapted to expand and contract to vary the volume of the closed space, whereby the pressure in the closed space is kept substantially equal to the atmospheric pressure. With this arrangement, since the collector does not permit the entry of humid ambient air into the closed space, no condensates will be produced on the inner surface of the cover glass. Further, if the diaphragm is adapted to sag and contact the panel due to its expansion at the time of abnormal heating, heat dissipation from the panel is accelerated. Thus damage to the panel due to overheating can be prevented.

5 Claims, 2 Drawing Figures

U.S. Patent

Nov. 15, 1983

4,414,958

SOLAR COLLECTOR

The present invention relates to a solar collector of panel type.

Generally in a solar collector of the type described the sunlight, after passing through a cover glass for keeping out ambient air, is absorbed by a heat collecting panel colored in black or having thereon a light selective absorption film, and the absorbed heat then is transmitted to a heat carrier, such as water, for use in a hot water heating system or the like. In order to efficiently collect heat from the sunlight, it is essential to effectively absorb the sunlight and to maximally retain the obtained heat.

To reduce heat loss involved, conventional solar collectors incorporate therein a further cover glass between the heat collector panel and first-mentioned cover glass. The further cover glass serves to cut off possible convection air which would otherwise occur in the space between the panel and first-mentioned cover glass when the panel is heated by the sunlight, consequently reducing the heat loss. However, when the irradiation of the sunlight stops and the panel cools down, the pressure in the space defined between the two cover glasses becomes negative due to the temperature fall and permits the entry of humid open air. In this state, if the panel is heated again with the irradiation of the sunlight to render the temperature in the interior space of the solar collector higher than the ambient temperature, condensates will be produced on the inner surface of the first-mentioned cover glass having a temperature close to the ambient temperature, with the result that the panel will receive reduced sunlight and will have less heat collecting efficiency.

The object of the present invention, in view of the above drawback, is to provide a solar collector of simple construction which entails reduced heat loss and affords reliable condensation prevention.

Another object of the invention is to provide a solar collector which, though efficiently collecting the sunlight, enhances heat dissipation from the heat collector panel to prevent an abnormal rise in the temperature of the panel at the time of emergency, such as at the time of no-load heating, and thereby avoid damage to the panel due to overheat.

To fulfil these objects, the solar collector of the invention comprises a heat collecting panel for receiving the sunlight and converting the sunlight to heat, a cover glass arranged a distance apart from and over the panel, a vessel having thereon the cover glass and accomodating therein the panel, and a sunlight-pervious diaphragm disposed between the panel and cover glass to form a closed space between itself and the cover glass, the diaphragm being adapted to expand and contract to vary the volume of the closed space.

Figure 2:
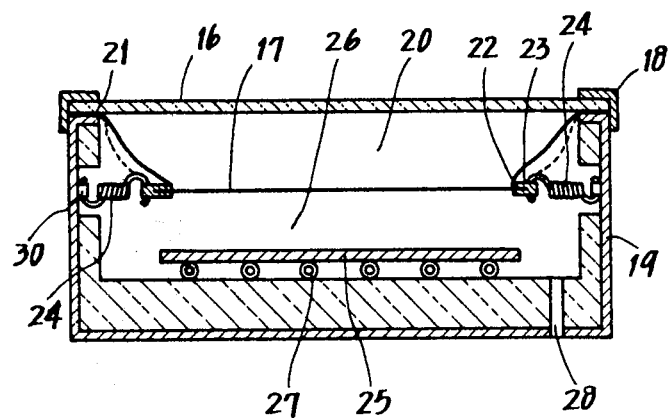

Various features and effects of the invention will be readily understood from the description of embodiments given with reference to the accompanying drawings, in which:

FIG. 1 is a view in vertical section showing a solar collector embodying the invention; and FIG. 2 is a view in vertical section showing another solar collector embodying the invention.

Referring to FIG. 1 showing an embodiment of the invention, a solar collector comprises a cover glass 1, a sunlight-pervious flexible diaphragm 2 (hereinafter referred to simply as "diaphragm 2") and a collector vessel 4. The cover glass 1, diaphragm 2 and vessel 4 are so fitted together by a metal fitting 3 at a first support portion 6 that there is formed a closed space 5 between the cover glass 1 and diaphragm 2. A frame 9 of acrylic resin is arranged, as supported on the bottom of the vessel 4, outwardly of a heat collecting panel 8 supported on a heat insulator 7. A second support portion 10 for the diaphragm 2 is formed at the top of the frame 9. The diaphragm 2 is tight-stretched on the second support portion 10 by weights 11 of brass rods arranged on the diaphragm 2 and between the frame and the lateral walls of the vessel 4 to thereby form an air layer 12 over the panel 8. Mounted under the panel 8 are pipes 13 for transferring therethrough a heat carrier. It should be noted here that the diaphragm 2 is made of a copolymer of ethylene tetrafluoride and propylene hexafluoride. The diaphragm 2 has a larger thermal expansion coefficient than the other materials comprised in the solar collector. The value of thermal coefficient of the diaphragm 2 is $800 \sim 1,000 \times 10^{-7}$/deg. The values of thermal coefficient of metals and glasses are $100 \sim 200 \times 10^{-7}$/deg.

The operation of the solar collector will now be described. When the temperature of the heat collecting panel 8 elevates with the irradiation of the sunlight, the air layer 12 between the panel 8 and diaphragm 2 is heated and pressurized, as also is the air in the closed space 5 between the diaphragm 2 and cover glass 1. And then the diaphragm 2 is heated and expanded thermally. As the result, the diaphragm 2 extends and the weights 11 push the outer portion of the diaphragm 2 in the direction to reduce the volume of a space 14 surrounded by the diaphragm 2, frame 9 and insulator 7 as indicated by a broken line in FIG. 1, consequently increasing the volume of the space 5. At this time, the air in the layer 12 escapes from between the diaphragm 2 and frame 9 at the second support portion 10 into the space 14. The air in the space 14 in turn is discharged through a pressure equalizing hole 15 provided in the vessel 4.

Conversely when the temperature of the panel 8 falls with weakening irradiation of the sunlight, the diaphragm 2 shrinks to reduce the volume of the space 5, with the result that the pressure in the space 5 is kept substantially equal to the atmospheric pressure. Thus the entry of damp open air into the closed space 5 can be prevented. In this state, even if there is a temperature difference between the ambient air and the air in the space 5, no condensates would be produced on the inner surface of the cooled cover glass 1. It is to be borne in mind that distances between the panel 8 and diaphragm 2 (when taut) and between the diaphragm 2 and cover glass 1 are so designed that the diaphragm 2 cuts off the convection air between the panel 8 and cover glass 1 to thereby minimize energy loss effectively.

Referring now to FIG. 2 showing another embodiment of the invention, a solar collector comprises a cover glass 16, a sunlight-pervious flexible diaphragm 2 (hereinafter referred to simply as "diaphragm 17") and a collector vessel 19. The cover glass 16, diaphragm 17 and vessel 19 are fitted together by a metal fitting 18 at a support portion 21, such that there is formed a closed space 20 between the cover glass 16 and diaphragm 17. The diaphragm 17 is tight-stretched by means of retainer means 23 attached to a folded portion 22 provided at a radially intermediate portion of the diaphragm 17 and elastic members, such as springs, provided between the retainer metals and the lateral walls of the vessel 19 to form an air layer 26 over a heat collecting panel 25. Each of the elastic members 24 is rotatably supported by a support 30 at one end thereof. Mounted under the panel 25 are pipes 27 for transferring therethrough a heat carrier.

The operation of the solar collector will now be explained. When the temperature of the panel 25 increases by the irradiation of the sunlight, the air layer 26 between the panel 25 and diaphragm 17 is heated and the air in the closed space 20 between the diaphragm 17 and cover glass 16 likewise is heated and pressurized. As the result, the diaphragm 17 extends thermally and the folded portion 22 of the diaphragm 17 displaces by the action of the elastic members 24. And the diaphragm 17 deforms so as to increase the volume of the closed space 20 as indicated by a broken line in FIG. 2, consequently maintaining the pressure in the space 20 substantially equal to the atmospheric pressure. At this time, the air in the air layer 26 is discharged through a pressure equalizing hole 28 in the vessel 19. The same operation as above will continue with a further temperature increase of the panel 25 until the elastic members 24 restore to their natural lengths.

If there is no or extremely insufficient heat carrier in the pipes 27 mounted under the panel 25, the system will be subjected to so-called no-load heating and the panel 25 will be further heated. So that the diaphragm 17 is further heated and extended thermally. However after the elastic members 24 restore to their natural lengths, they cannot contract any more; that is, they cannot afford tension force to the diaphragm 17, with the result that the diaphragm 17 sags and contacts the panel 25. With the diaphragm 17 sagging like this, the volume of the closed space 20 and the convection heat exchange coefficient in the space 20 will increase, consequently enhancing heat dissipation from the panel 25. The temperature of the panel thus falls to reach equilibrium at a constant temperature. It is to be borne in mind that the diaphragm 17 must sufficiently endure the heat from the panel 25 and for this reason consists of a copolymer of ethylene tetrafluoride and propylene hexafluoride.

If the surface of the panel 25 has selective absorption characteristic, the panel 25 is generally good in heat absorption and bad in heat dissipation through air. But even in this case, the contact between the diaphragm 17 and panel 25 renders the temperature of the former equal to that of the latter to release heat of the latter through the former into the space 20. Thus an excessive rise in the temperature of the panel is effectively prevented.

The same protection effect of the panel as above can be expected in the first embodiment shown in FIG. 1.

When the temperature of the panel 25 drops with fading irradiation of the sunlight, the diaphragm 17 contracts to decrease the volume of the space 20, with the result that the pressure in the space 20 is maintained substantially equal to the atmospheric pressure. Thus the entrance of humid open air into the space 20 can be prevented. In this state, even if there is a temperature difference between the ambient air and the air in the space 20, no condensates would be produced on the inner surface of the cooled cover glass 16. It is to be noted that distances between the panel 25 and diaphragm 17 (when taut) and between the diaphragm 17 and cover glass 16 are so designed that the diaphragm 17 intercepts the convection air between the panel 25 and cover glass 16 to thereby reduce energy loss effectively.

We claim:
1. A solar collector comprising:
   a heat collecting panel for receiving the sunlight and converting the sunlight to heat,
   a cover glass arranged a distance apart from and over the panel,
   a vessel having thereon the cover glass and accomodating therein the panel,
   a sunlight-pervious diaphragm disposed between the panel and the cover glass to form a closed space between itself and the cover glass, the diaphragm being adapted to expand and contract to vary the volume of the closed space in response to temperature variations,
   pressure equalizing means provided in the vessel on the side of the diaphragm opposite said closed space, and
   means for limitively stretching the central portion of the diaphragm substantially in parallel to and substantially a predetermined distance above the panel whereby said central portion of the diaphragm remains taut below a specified temperature but is allowed to start sagging at said specified temperature.

2. A solar collector as defined in claim 1 further comprising a first support portion for tightly attaching the peripheral portion of the diaphragm to the cover glass, a second support portion provided inwardly of the first support portion and outwardly of the panel, said second support portion slidably supporting the border of said central portion of the diaphragm, and wherein said means for stretching the central portion of the diaphragm comprises weights provided on the diaphragm between the first and second support portions.

3. A solar collector as defined in claim 1 further comprising a folded portion provided at the border of the central portion of the diaphragm, retainer means fixed to the folded portion, and wherein said means for stretching the central portion of the diaphragm comprises elastic members disposed between the retainer means and the lateral walls of the vessel.

4. A solar collector as defined in claim 1 wherein the diaphragm has a larger thermal expansion coefficient than the thermal expansion coefficients of the members supporting it.

5. A solar collector as defined in claim 1 wherein the diaphragm comprises a copolymer of ethylene tetrafluoride and propylene hexafluoride.

* * * * *

UNITED STATES PATENT AND TRADEMARK OFFICE
CERTIFICATE OF CORRECTION

PATENT NO. : 4,414,958
DATED : November 15, 1983
INVENTOR(S) : SHIRO HOZUMI ET AL It is certified that error appears in the above—identified patent and that said Letters Patent is hereby corrected as shown below:

Column 2, line 67, after "springs," insert -- are --.

line 68, "metals" should read -- means --.

Signed and Sealed this

Twenty-eighth Day of February 1984

[SEAL]

Attest:

GERALD J. MOSSINGHOFF

Attesting Officer     Commissioner of Patents and Trademarks